United States Patent
Petrucelli et al.

[11] Patent Number: 5,832,417
[45] Date of Patent: Nov. 3, 1998

[54] APPARATUS AND METHOD FOR AN AUTOMATIC SELF-CALIBRATING SCALE

[75] Inventors: Steven P. Petrucelli, Cranbury; Damon Germanton, Kennalon; Stephen A. Orbine, Bernardsville, all of N.J.

[73] Assignee: Measurement Specialties, Inc., Fairfield, N.J.

[21] Appl. No.: 757,797

[22] Filed: Nov. 27, 1996

[51] Int. Cl.[6] .................................................. G01C 25/00
[52] U.S. Cl. ................... 702/101; 364/567; 364/571.01; 364/557; 364/571.05; 177/25.13
[58] Field of Search .................. 364/571.03, 571.01, 364/557, 567, 556, 571.05; 177/25.13, 50, 185, 1, 164, 3; 73/1.13

[56] References Cited

U.S. PATENT DOCUMENTS

| | | | |
|---|---|---|---|
| 3,665,169 | 5/1972 | Henderson et al. | 364/567 |
| 4,041,289 | 8/1977 | Brosh et al. | 235/151.33 |
| 4,137,979 | 2/1979 | Itani | 177/210 R |
| 4,241,407 | 12/1980 | Sookikian et al. | 364/567 |
| 4,313,510 | 2/1982 | Tomlinson, Jr. | 177/165 |
| 4,316,517 | 2/1982 | Jonath | 364/567 |
| 4,330,837 | 5/1982 | Itani | 364/567 |
| 4,417,631 | 11/1983 | Johnson | 177/210 FP |
| 4,464,725 | 8/1984 | Briefer | 364/571.03 |
| 4,535,854 | 8/1985 | Gard et al. | 177/1 |
| 4,630,696 | 12/1986 | Kemnitz | 177/165 |
| 4,649,494 | 3/1987 | Rosas | 364/478.11 |
| 4,667,153 | 5/1987 | Doyle | 324/130 |
| 4,751,661 | 6/1988 | Amacher et al. | 364/567 |
| 4,760,539 | 7/1988 | Amacher et al. | 364/571.01 |
| 4,890,246 | 12/1989 | Oldendorf et al. | 364/567 |
| 4,909,338 | 3/1990 | Vitunic et al. | 177/50 |
| 4,914,611 | 4/1990 | Yamanaka et al. | 364/567 |
| 4,917,199 | 4/1990 | Loshbough | 177/210 C |

*Primary Examiner*—James P. Trammell
*Assistant Examiner*—Hien Vo
*Attorney, Agent, or Firm*—Plevy & Associates

[57] ABSTRACT

The present weight scale performs automated self calibration by periodically initiating a measurement operation to determine the zero offset from a true weight reading due the weight scale's intrinsic weight. The weight scale's intrinsic weight will vary due to changes in environmental conditions such as temperature and humidity, which impact the behavior of the internal electronics that perform the weight measurement operations. The automated self calibration is provided by a counter circuit, clocked by a low power oscillator, that periodically initiates the weight scale's electronics to undertake a weight measurement of the tare weight value of the scale. The tare weight value is stored in memory until replaced by a subsequent tare weight value calculation. During a weight measurement operation the gross weight measurement is deducted by the tare weight value stored in memory to arrive at a net weight representing a user's true weight.

29 Claims, 3 Drawing Sheets

APPARATUS AND METHOD FOR AN AUTOMATIC SELF-CALIBRATING SCALE

FIELD OF THE INVENTION

The present invention relates to scales and more particularly to a circuit for periodically recalibrating the scale electronics.

BACKGROUND OF THE INVENTION

Electrical weighing scales typically use a semiconductor sensor configuration, employing piezoresistors in a bridge configuration, which transform the mechanical deformation from weight applied to the scale into an electrical signal proportional to the mechanical deformation. The output from the semiconductor sensor configuration is usually amplified by an operational amplifier based circuit. The amplified output is usually connected to an analog-to-digital converter to provide a digitized output directed to a display driver and digital display. Various embodiments of electronic weighing scales may also include an oscillator, counter, memory modules, i.e., RAM or ROM, CPU chips, digital-to-analog converters for analog displays, switches, and power control related circuits.

To attain a desired accuracy, the weighing scales usually employ circuit techniques, digital or analog, to compensate for an offset, i.e., shift in the weight indications of the weighing scale, due to aging of components, and changing environmental conditions such as temperature, humidity, etc. Accuracy requirements for the weighing scale are usually met by calibration methods, whereby the scale displays a predetermined reference value, normally zero, when no weight is applied to the scale. Through use, the zero reference of the scale may shift due to a variety of causes including any of the following: accumulation of foreign matter on the scale electronics, the effect of changing ambient temperature and humidity on the electronic components, and aging of the electrical components.

The prior art discloses various circuit techniques for automatically calibrating a scale. For example, U.S. Pat. No. 4,890,246 to Oldendorf, entitled ELECTRONIC BALANCE WITH CALIBRATING SYSTEM, discloses a calibration system which employs a microprocessor, a memory to store a signal indicative of temperature and a comparator which upon instruction, compares instantaneous temperature with the stored temperature value. If the difference between the stored and instantaneous temperatures exceeds a given amount, a signal element indicative of the need to recalibrate using a calibration weight is actuated.

As another example, U.S. Pat. No. 4,464,725 to Briefer, entitled TEMPERATURE COMPENSATED MEASURING SYSTEM, discloses a system which utilizes an internal signal processor which in the calibration mode, provides mathematical constants to generate a temperature compensation function.

As a further example, U.S. Pat. Nos. 4,751,661 entitled AUTOMATIC ZERO BALANCING OF A WEIGHING APPARATUS and, 4,760,539 entitled METHOD OF CALIBRATING A WEIGHTING APPARATUS, both to Amacher et al., disclosing zero balancing a scale involving connecting a microprocessor to the display in the weight scale. The microprocessor processor disables the display from the scale and takes a number of readings from the scale in response to the removal of a weight on the scale. The microprocessor then obtains an average reading for a zero weight condition on the scale by dividing the sum of the readings by the number of the readings taken. This procedure is repeated until two consecutive average readings are within a first predetermined limit.

As a final example, U.S. Pat. No. 4,914,611 to Yamanaka et al., entitled FORCE MEASURING DEVICE, discloses a device that automatically compensates for temperature-induced zero and span deviations. The device includes force and temperature sensors for producing force and temperature indicative signals, respectively. The force and temperature signals are processes at various temperatures in no-load and reference load conditions by regressive analysis in order to obtain and store in memory equations representing the zero and span deviations with temperature. During the use of the use of the force measuring device for measurements, the device uses the stored equations to calculate the zero and span deviations from the current temperature to correct the force indicative signal.

Weight scales are often placed in bathrooms and other locations where temperature, humidity, and ambient light vary with different activities. Moreover, since such weight scales utilize battery type power supplies, simpler internal electronics for initiating a zero shift determination are needed so as to minimize the power drawn from the battery supply. Nothing in the prior art noted herein above, nor in the prior art in general, discloses calibration performed automatically at predetermined time intervals to adjust for ambient conditions. Nor does the prior art disclose automatically illuminating the display readings when the ambient light during a user weight measurement falls below minimum acceptable levels. Furthermore, the prior art examples noted above employ costly and complicated circuit techniques to determine when and how calibration procedures should be undertaken.

Accordingly, there is a need for a weighing scale that automatically performs a calibration to compensate for the change in zero shift due to the tare weight value changing under varying environmental conditions.

SUMMARY OF THE INVENTION

The present invention is an electronic weight scale that automatically calibrates itself to compensate for a shift in the zero offset due to the scale's tare weight value which changes with varying environmental conditions such as temperature and humidity. The scale includes an oscillating circuit that provides a periodic timing reference signal. The output from the oscillating circuit drives a counter circuit which, after a predetermined count, outputs a wake up signal to the scale's measurement circuit. Upon being enabled by the wake up signal from the counter, the measurement circuit operates to perform a measurement of the scale's tare weight value and stores that tare weight value in memory. The stored tare weight value represents the shift from true zero weight when the scale is unloaded. When a load is applied to the scale, the measurement circuit measures the gross weight detected by load sensors and subtracts the tare weight value stored in memory to arrive at a correct net weight value. The tare weight value is updated repeatedly with a predetermined frequency.

In a preferred embodiment, the oscillating circuit is a low power, RC based oscillating circuit that provides a one (1) kHz output signal. The one (1) kHz signal clocks a 20 bit digital counter that provides the wake up trigger to the measuring circuit approximately every twenty minutes. The measuring circuit in turn determines the tare weight value of the scale and stores that tare weight value in a RAM storage device. When the scale detects a load applied to the scale, such as a user stepping on the platform of the scale, the gross weight of the scale and the applied load is determined. The measurement circuit then proceeds to retrieve the most recent tare weight value from memory and subtracts it from the gross weight to arrive at a net weight indicative of the weight of the applied load.

In further embodiments, the weight scale includes an ambient light detector such as a photodiode which detects when the ambient light conditions fall below a certain level and enables the scale to illuminate the display for proper viewing by a user. Additionally, the scale can employ a position sensor which deactivates the self calibration operation while the scale is stored on its side. The position sensor is preferably a type of contact switch which is operated to detect when the scale is or is not positioned horizontally and squarely on its load sensors.

DETAILED DESCRIPTION OF THE INVENTION

Although the present invention can be used in many different applications where weight measurements are taken, the present invention is especially suited for use in connection with a domestic weighing scale, i.e., a bathroom scale. Accordingly the present invention will be described in conjunction with a domestic weighing scale to set forth the best mode of the present invention.

Domestic weighing scales are frequently kept in bathrooms where the environmental conditions, such as temperature, humidity, and ambient light, change over a period of time and with different activities in the bathroom. The variations in the environment create a shift in the zero balance which must be compensated for to display accurate weight readings. The present invention compensates for the zero shift in the weight reading due to the intrinsic weight of the scale, which changes with variations in the environment, by automatically initiating a measurement cycle, performing a zero calibration capture, and storing the zero shift in memory. When a user steps on the scale and initiates a weighing operation, the previously stored "tare" weight value is subtracted from the current weight measurement to arrive at an accurate weight determination.

Figure 1:
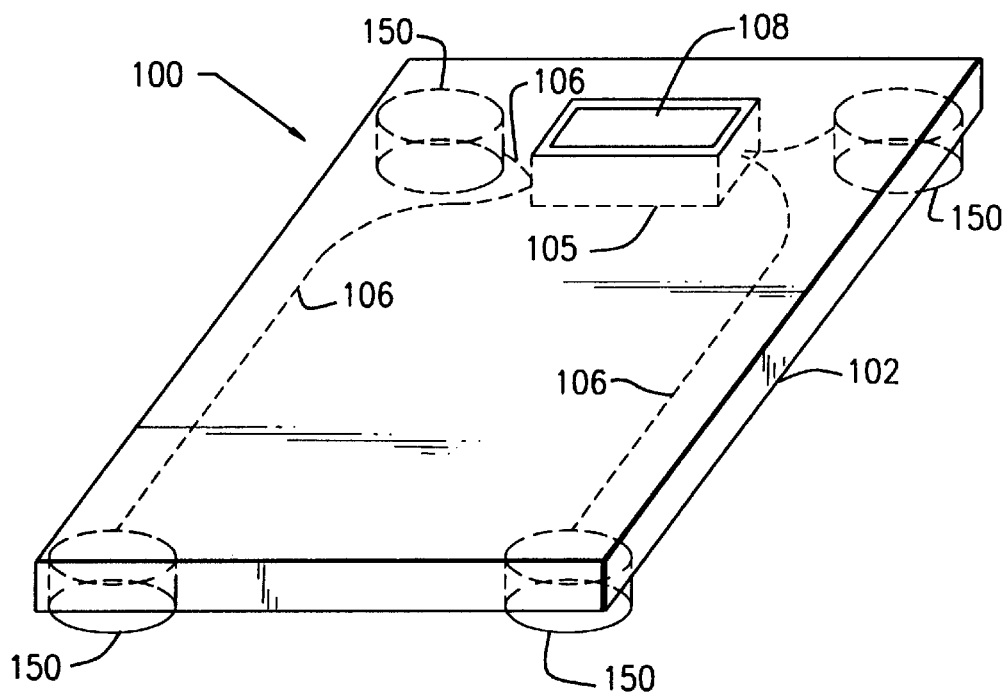
FIG. 1 is a perspective view of a typical electrical weighing scale employing load cells equipped with sensor plates.
Figure 2:
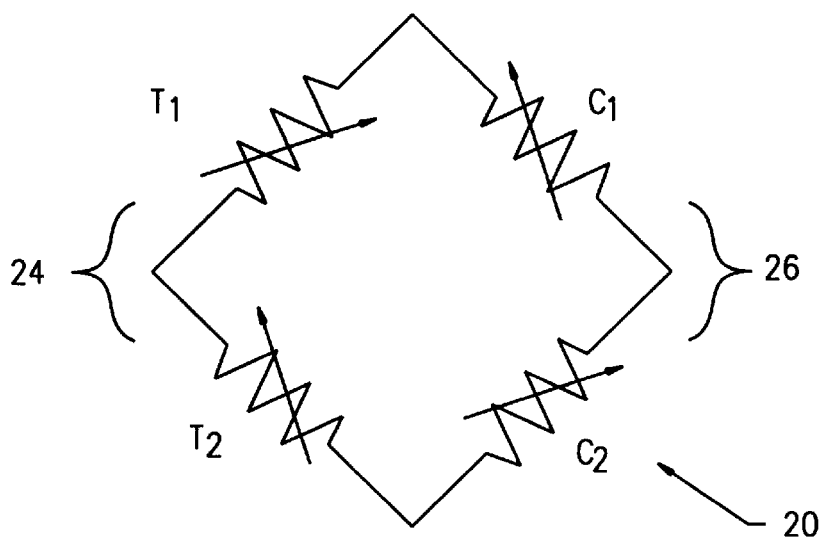
FIG. 2 is a circuit schematic diagram of a bridge configuration of strain gauges of a sensor plate.

Referring now to FIG. 1, there is shown a perspective view of an electrical weighing scale 100 employing load cells 150 equipped with sensor plates (not shown). Generally, the scale 100 comprises a platform 102 supported at each corner by a load cell 150 which contains a sensor plate with strain gauges. The strain gauges are typically inter-coupled in a bridge configuration 20, as shown in FIG. 2, with one leg 24 including strain gauges T1 and T2 in tension and the other leg 26 including strain gauges C1 and C2 in compression, under load conditions. It should be understood, that the present invention of automatic self-calibration is not limited to the load sensor and associated sensor plate arrangements described above. Accordingly, other well known load sensor arrangements may be employed in the present invention if desired.

Referring back to FIG. 1, the scale 100 also includes a display assembly 104 which is electrically coupled to the sensing arrangement of each sensor plate contained in the load cells 50 via wiring cables 106. When a person stands on the platform 102, the person's weight is distributed among the four load cells 150, such that the strain sensing arrangement 20 of each load cell's sensor plate generates an electrical signal which is proportional to the load on the load cell. The four signals generated by each load cell 150 are transmitted by the wiring 106 to the display assembly 104 which includes electronic circuitry that combines the four signals into a single analog signal which is proportional to the sum of the loads on the four individual load cells 150.

The display assembly also includes an amplifier (not shown) that amplifies the load cell 150 output signal, and an analog-to-digital converter (not shown) which translates the analog signal to a digital signal. Additional well known circuitry (not shown) in the display assembly 104 transforms the digital signal into a reading in pounds or the like which is digitally displayed on the display screen 108 of the display assembly 104. The above described electronic circuitry contained within the display assembly 104 is well known in the art. An example of such circuitry can be found in co-pending U.S. patent application Ser. No. 08/385,349.

Figure 3:
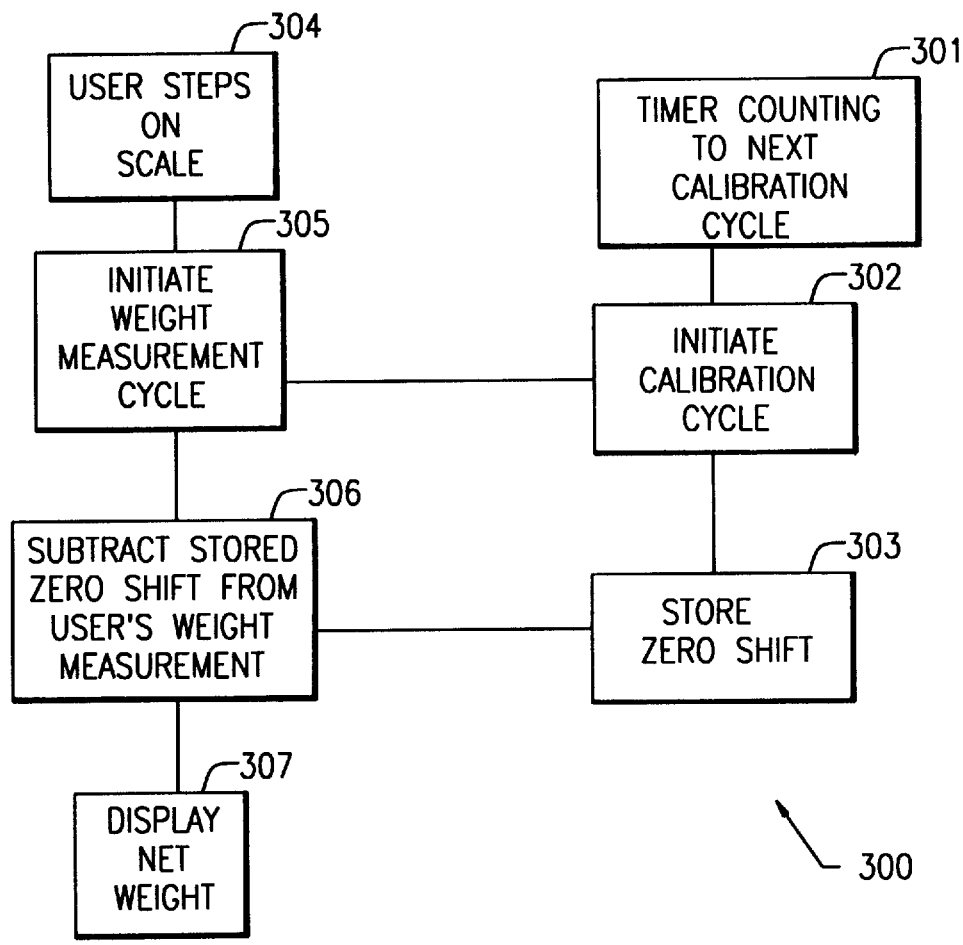
FIG. 3 is a flow chart of the operation of a weight scale automatically performing self-calibration in accordance with the present invention.

Referring now to FIG. 3, there is shown a flow chart 301 of the automatic self-calibration of a weight scale in accordance with the present invention. A timer circuit 301 operates through a predetermined time period and prompts the weight scale electronics to initiate a calibration cycle 302. Preferably, the interval for initiating a calibration cycle is every 20 minutes, however, the interval may be lengthened or shortened depending on the rate of change of the environmental conditions where the weigh scale is normally kept and used. The scale 100 performs a calibration 302 by initiating a weight measurement cycle 305 and determining the shift from a zero weight reading due to the weight scale being stored in changing environmental conditions such as temperature, humidity, etc. The weight scale stores the zero shift value in memory 303.

When a user steps on the scale 304 a weight measurement operation 305 is initiated. The scale subtracts 306 the current zero shift value stored in memory 304 from the weight measurement to arrive at a correct net weight 307 which is displayed for the user. It should be understood that the present method for automatic self-calibration may utilize the weight scales existing weight measurement circuitry to repeatedly update the "tare" weight value which may vary due to changing environmental conditions. This tare weight value is the scale's own intrinsic weight.

Figure 4:
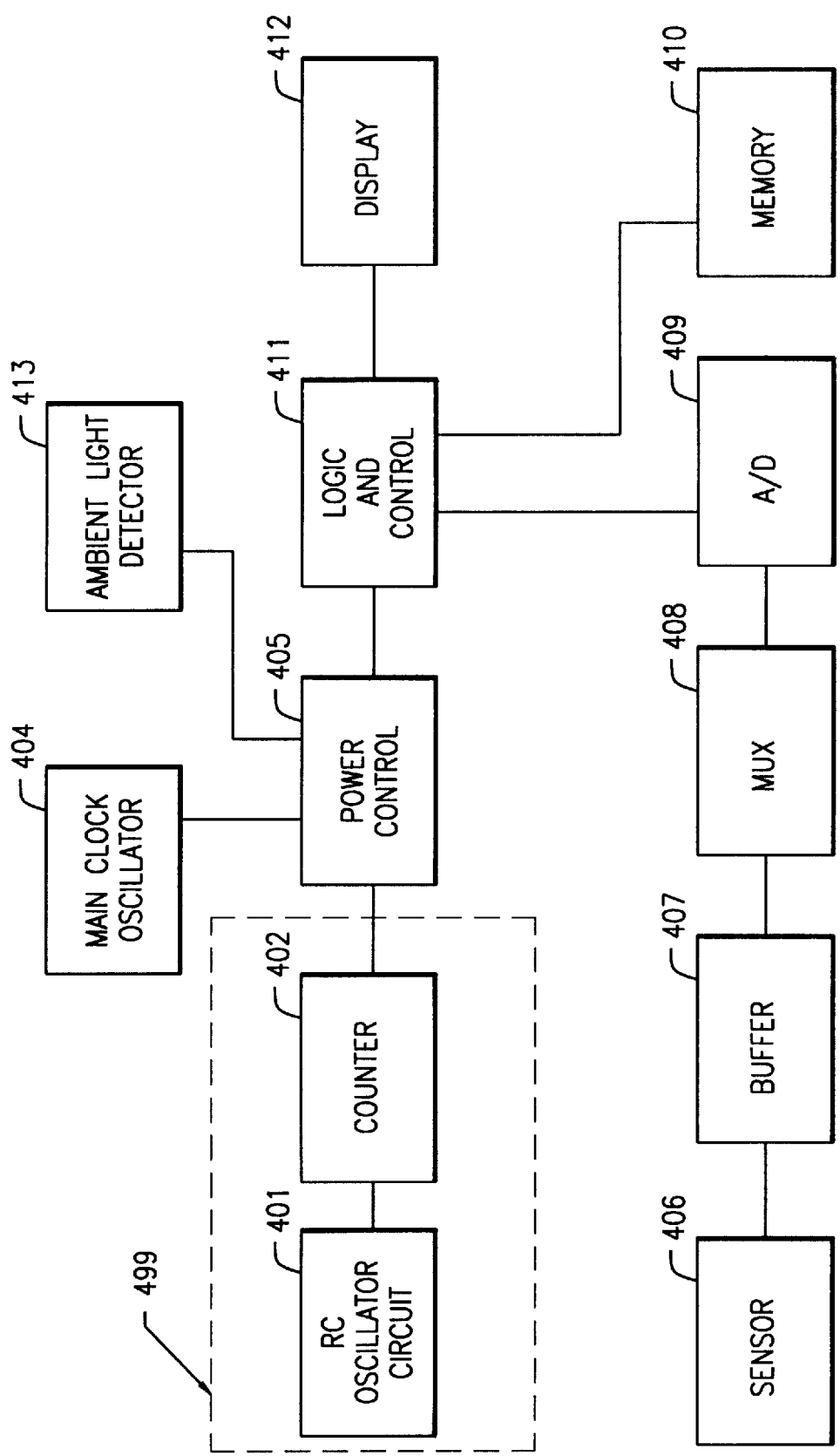
FIG. 4 is a block diagram of the automatic self-calibration of a weighing scale in accordance with the present invention.

Referring now to FIG. 4, there is shown a block diagram 400 of an automatic self calibrating weight scale in accordance with the present invention. The key to automatic self calibration in accordance with the present invention lies in the timer circuit 499 which initiates a calibration cycle at predetermined time intervals. A low power, 1 kHz RC oscillator circuit 401 is employed to provide an oscillating signal to a counter 402. An RC based audio oscillator 401 permits use of a low cost commercially available integrated circuit device exhibiting low power drain timer operation, while providing a stable oscillating output signal. The construction and operation of RC based oscillators is well known in the prior art and need not be discussed in detail herein. However, it should be noted that other types of oscillators, commercially available, exhibiting appropriate low power consumption may be utilized within the scope and intent of the present invention.

The output signal from the oscillating circuit 401 drives a counter 402 which upon a selected time period provides a wake up trigger signal to the power control circuit 405. Essentially, the counter 402, which is clocked by the oscillating input signal, digitally counts from zero up to $2^N$, where N is the number of bits. The period between counts is determined in part by the period of the oscillating input signal from the oscillator circuit 401. For a 1 kHz oscillating signal the period is 1/1000 of a second (sec). Assuming the counter 402 sequentially increments 1 binary digit every clock period, to preferably provide a wake up trigger approximately every twenty minutes, one must determine the number of minimum bits allow for a full count at approximately 20 minutes. For the present invention, the clock period (0.001 sec)×the number of counts=20 minutes (min)×60 sec/min. Under this relationship the number of sequential counts is determined to be 1,200,000.

For a binary counter, assuming it starts with all bits initially low, $2^N-1$ represents the highest possible count when all bits go high, therefore, solving the equation $2^N-1=1,200,000$ results in N being approximately 20 bits. Accordingly, for initiating a calibration sequence approximately every 20 minutes, the counter 402 must be at least a 20 bit counter. It is noted that selecting a counter with less than 20 bits will result in more frequent calibrations being initiated, and with more bits being selected vice versa. The selection of 20 minute intervals for initiating a recalibration is based on the assumption that in all likelihood, the ambient conditions in the room where the scale is stored or used does not change significantly and, the tare value stored in the memory correctly represents an accurate zero shift compensation value. Various counters and their circuit construction, suitable for the present invention, are well known in the art and readily available in commercial form, therefore, their circuit construction need not be discussed in detail herein.

The wake up signal from the counter 402, approximately every twenty minutes, triggers the power control circuit 405, which in turn enables, i.e., energizes, the main system oscillator 405 to initiate a measurement cycle. The power control circuit 405 also functions to control dissipation of energy from a portable power supply such as batteries. Centralized power control in this manner assures that energy from such a portable, limited power source is utilized only by the oscillator circuit 401, the counter 402, and memory storage of the most recent zero capture, between zero calibration and weight measurement operations.

When a calibration cycle is initiated the system performs a zero capture, which represents the "tare" weight of the scale under the then existing environmental conditions, i.e., temperature and humidity, etc., and stores the value in volatile memory 410 such as RAM. More specifically, each of the sensor 406 in each load cell provides a signal proportional to the weight of the scale. The output of each sensor 406 is amplified by a distinct buffer amplifier 407. Additionally, the buffer amplifier 407 isolates its output terminal from the load impedance variation from the input side, coupled to the sensor 406, to provide a constant to the multiplexer 408 input. Hence, the load signals produced simultaneously by all four load cells, are held till multiplexed 408 into a serial data signal which is converted by the A/D converter 409 to a digital data stream.

The digital data stream from the A/D converter 409 is directed to the logic and control circuit 411. The logic and control circuit 411 may comprise a CPU and appropriate logic chips such as comparators, summation chips including shift data registers for performing binary subtraction by addition of binary bits, etc. The logic and control circuit 411 appropriately processes the four load signals, in the data stream from the A/D converter 409, to arrive at a single "tare" weight value which is stored in the memory 410. When the logic and control circuit 411 detects values from the A/D converter that are out of a predetermined range based on a tolerance criterion, the out of range values are rejected. Such an out of range error might occur if the scale is stored on its side rather than on horizontally on its feet, i.e., the load cells. Alternatively, storage of the weight scale on its side may be detected with a spatial orientation sensitive switch, i.e., electromechanical type contact switches. The switch may be operated to bias the power control circuit 405 from not energizing the timer circuit 499 at all when the scale is stored on its side. Such contact switches are well known in the art and need not be discussed in great detail herein.

When the logic and control circuit 411 detects a user stepping on the weight scale, a weighing operation is initiated. A user stepping on the weight scale can be detected by electromechanical means such as a spring biased contact switch (not shown), positioned under the platform of the weight scale, which conducts current when the user's weight forces the biasing spring to compress a certain amount in response to a predetermined weight being exerted on the platform 102 of the weight scale. Alternatively, the weight at which the spring biased contact switch closes may be conveniently chosen to coincide with the low end of the weight scale's measurement range. Upon processing the load signals received from the A/D converter 409, the tare weight value, determined and stored in memory 410 during the most recent calibration cycle, is copied from memory and subtracted from the weight measurement to display 412 a net weight measurement indicative of the user's true weight measurement. The logic and control circuit 411 can be readily augmented with a means for performing the required subtraction by including an additional register for downloading the stored tare weight value, shifting the register bits for summation with a weight measurement data shift register so as to effect the required subtraction. The summation and subtraction of digital data is well known in the art and need not be discussed in detail herein.

Alternatively, the weight scale 400 may be augmented with an ambient light detector 413. The ambient light detector 413 can be a simple semiconductor photodiode which is coupled to a part of the circuit 400, such as the power control 405. Under conditions when the weight scale is not stepped upon by a user, the detector 413 can be operated to bias the circuit path which energizes the bulb that illuminates the display, in a nonconductive state. When the system detects a user stepping on the scale and the ambient light falls below the level necessary for a user to accurately read the display reading, the lack of incident ambient light on the detector 413 can bias the circuit path which energizes the bulb that illuminates the display, in a conductive state. In this manner, the portable battery power source is conserved by only energizing the display when a user steps on the scale and the ambient light conditions where the scale is being used are insufficient for the user to read the scale.

It should be understood that the embodiment described herein is merely exemplary and that a person skilled in the art may make many variations and modifications to this embodiment utilizing functionally equivalent elements to those described herein. Any and all such variations or modifications as well as others which may become apparent to those skilled in the art, are intended to be included within the scope of the invention as defined by the appended claims.

What is claimed is:

1. An automatic calibration system for an electronic instrument for measuring a parameter for producing an output signal which undesirably has to be calibrated as a function of ambient conditions, said automatic calibration system comprising:

automatic means coupled to said electronic instrument for periodically turning on said electronic instrument independent of an applied load force; and calibration means responsive to said ambient conditions for calibrating said electronic instrument according to said ambient conditions to enable a correct measurement to be made.

2. The automatic calibration system in accordance with claim 1, wherein said automatic means comprises an RC based oscillating circuit providing a 1 kHz timing reference signal.

3. The automatic calibration system in accordance with claim 1, wherein said automatic means comprises a digital counter with a selectable number of bits for varying the period at which said electronic instrument is turned on.

4. The automatic calibration system in accordance with claim 1, wherein said calibration means comprises storage means for storing a calibration value.

5. The automatic calibration system in accordance with claim 1, wherein said calibration means does not store any calibration value exceeding the range of a predetermined criterion.

6. The automatic calibration system in accordance with claim 5, wherein said predetermined criterion is selected so that any said calibration value exceeding said predetermined criterion is indicative of said electronic instrument being improperly stored.

7. The automatic calibration system in accordance with claim 1, wherein said calibration means periodically determines a calibration value and adjusts subsequent weight measurements according to said calibration value.

8. An automatic calibration system for an electronic instrument for measuring a parameter for producing an output signal which undesirably has to be calibrated as a function of ambient conditions, said automatic calibration system comprising:

automatic means coupled to said electronic instrument for periodically turning on said electronic instrument comprising a 20 bit digital counter operable for setting the period at approximately every twenty minutes at which said instrument is turned on; and calibration means responsive to said ambient conditions for calibrating said electronic instrument according to said ambient conditions to enable a correct measurement to be made.

9. The automatic calibration system in accordance with claim 8, wherein said calibration means further comprises orientation means for detecting when said electronic instrument is being improperly stored and disabling power to said activation means.

10. The automatic calibration system in accordance with claim 9, wherein said orientation means comprises an electrical contact switch operable to detect when said electronic instrument is not being stored on its load cells in a near horizontal orientation.

11. The automatic calibration system in accordance with claim 8, further comprising a light detection means for detecting when ambient light conditions fall below a predetermined brightness level where a user can sufficiently read a weight measurement displayed by said electronic instrument.

12. The automatic calibration system in accordance with claim 11, wherein said ambient light detection means enables a light bulb to illuminate a weight measurement display in said electronic instrument when said electronic instrument is undertaking a weight measurement of a load being applied to said electronic instrument.

13. The automatic calibration system in accordance with claim 12, wherein said light detection means comprises a semiconductor photodiode.

14. An electronic weight scale operable for automated self calibration comprising:

a timing circuit operable to periodically trigger said electronic weight scale to initiate a weight measurement upon the elapse of a predetermined interval of time, wherein said timing circuit comprises an oscillating circuit and a 20 bit digital counter circuit driven by said oscillating circuit, said 20 bit digital counter circuit operable to provide an output signal;

a measurement circuit operable to determine a tare weight value for said electronic scale in response to said output signal provided by said timing circuit; and a storage device coupled to said measurement device, wherein said storage device is operable to store the most updated said tare weight value for retrieval by said measurement circuit to subtract from a subsequent weight measurement for a load applied to said electronic scale.

15. The electronic scale in accordance with claim 14, wherein said oscillating circuit is a low power, RC based oscillating circuit operable to provide a one (1) kHz output signal.

16. The electronic scale in accordance with claim 14, wherein said counter circuit repeatedly provides said output signal to said measurement circuit approximately every twenty minutes.

17. The electronic scale in accordance 14, wherein said measurement circuit is operable to disregard said tare weight value which is out of range of a predetermined criterion.

18. The electronic scale in accordance with claim 17, wherein said predetermined criterion is selected so that said tare weight value falling out of range of said predetermined criterion is indicative of said electronic scale being stored on one of its sides other than the side intended for proper determination of said tare weight value.

19. The electronic scale in accordance with claim 14, further comprising a position sensitive device operable to detect when said electronic scale is not positioned on its load sensors, said position sensitive device influencing said measurement circuit.

20. The electronic scale in accordance with claim 19, wherein said position sensitive device is an electromechanical switch sensitive to movements relative to a preselected plane.

21. The electronic scale in accordance with claim 14, further comprising a photosensor device operable to detect the level of ambient light where said electronic scale is located and influence the illumination of a display in said electronic scale.

22. The electronic scale in accordance with claim 14, wherein said photosensor device is operable to influence the illumination of said display only when said electronic weight scale senses a load being applied.

23. A method for automatically calibrating the zero shift in an electronic weight scale due to changes in tare weight value influenced by changing environmental conditions, said method comprising the steps of:

determining an elapse of a predetermined period of time of approximately twenty minutes;

measuring said tare weight value of said electronic weight scale upon said elapse of said predetermined period of time;

storing said tare weight value for subtraction from subsequent weight measurements when a load is applied to said electronic weight scale; and repeating, after an said elapse of said predetermined period of time, said steps of determining, measuring, and storing after each prior sequence of said steps of determining, measuring, and storing.

24. The method in accordance with claim 23, wherein said predetermined period of time is approximately twenty (20) minutes.

25. The method in accordance with claim 23, further comprising the step of disregarding and not storing any said tare weight values falling out of range of a predetermined criterion.

26. The method in accordance with claim 23, further comprising the step of determining when said electronic weight scale is not oriented in a proper position for accurate measurement of said tare weight value.

27. The method in accordance with claims 23, further comprising the initial step of determining whether said electronic weight scale is oriented on a side other than the proper side for said step of measuring said tare weight value.

28. The method in accordance with claim 27, wherein said step of measuring said tare weight value is aborted if said electronic weight scale is not oriented properly.

29. The method in accordance with claim 23, further comprising the step of illuminating a display of a weight measurement for an applied load when ambient light conditions where said electronic weight scale is located are below light levels acceptable for proper user perception of said display.

\* \* \* \* \*